March 15, 1966 D. SHICHMAN 3,240,853
THERMOPLASTIC FILM MAKING
Filed June 1, 1961 6 Sheets-Sheet 1
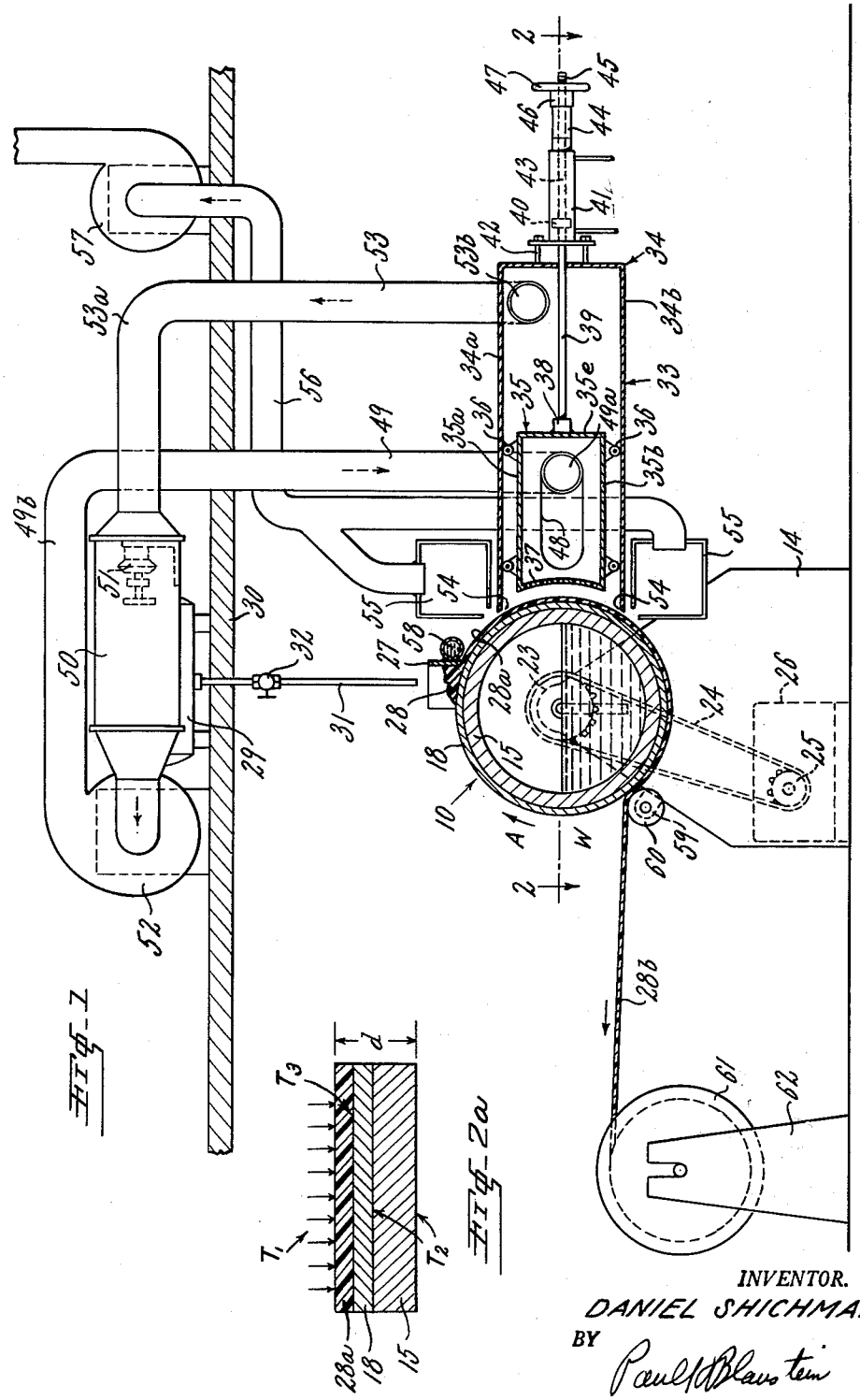
INVENTOR.
DANIEL SHICHMAN
BY
Paul A. Blaustein
ATTORNEY March 15, 1966 D. SHICHMAN 3,240,853
THERMOPLASTIC FILM MAKING
Filed June 1, 1961 6 Sheets-Sheet 2
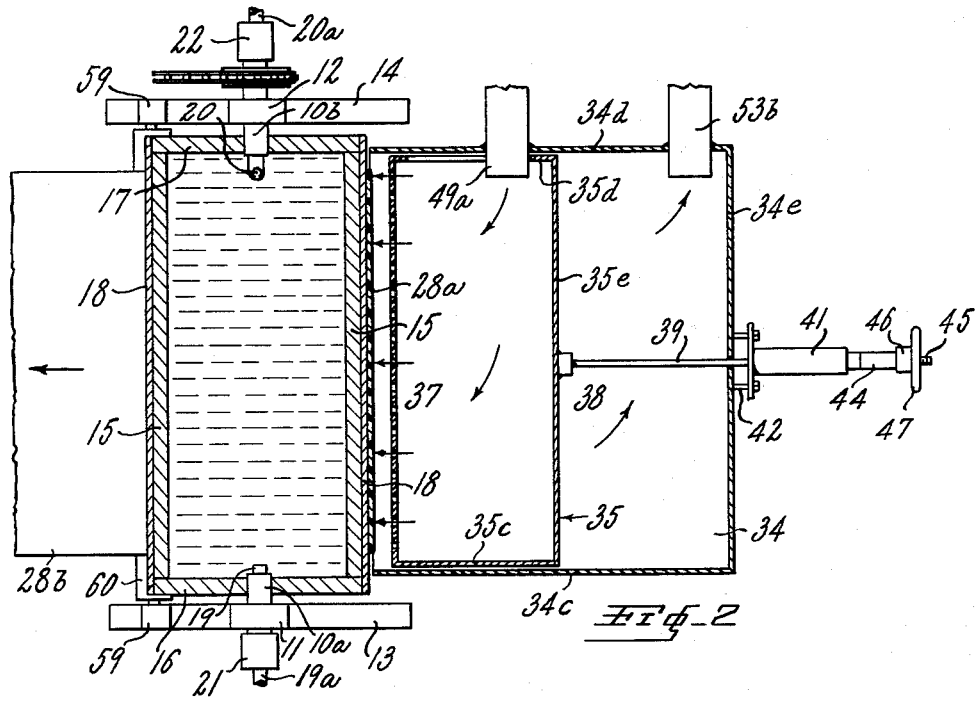
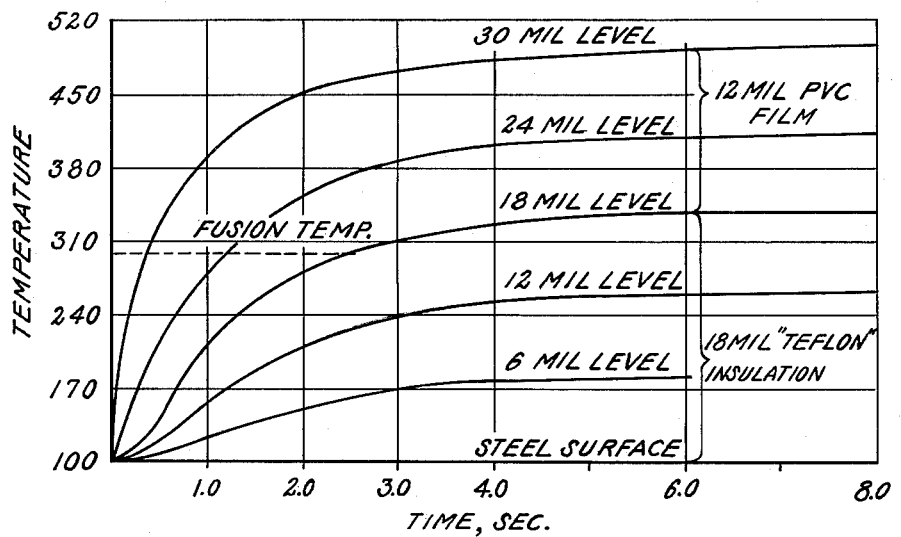
INVENTOR.
DANIEL SHICHMAN
BY
Paul H Blaustein
ATTORNEY March 15, 1966  D. SHICHMAN  3,240,853
THERMOPLASTIC FILM MAKING
Filed June 1, 1961  6 Sheets-Sheet 3

INVENTOR.
DANIEL SHICHMAN

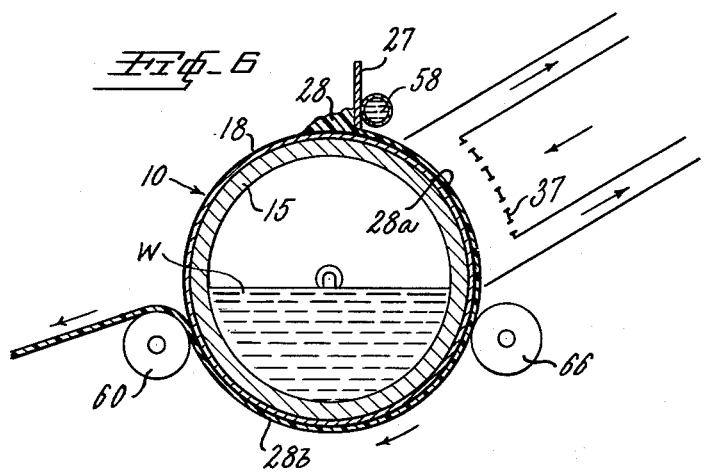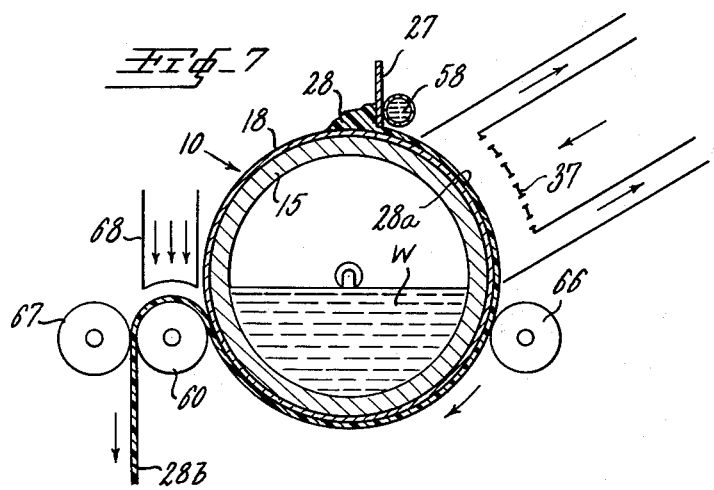

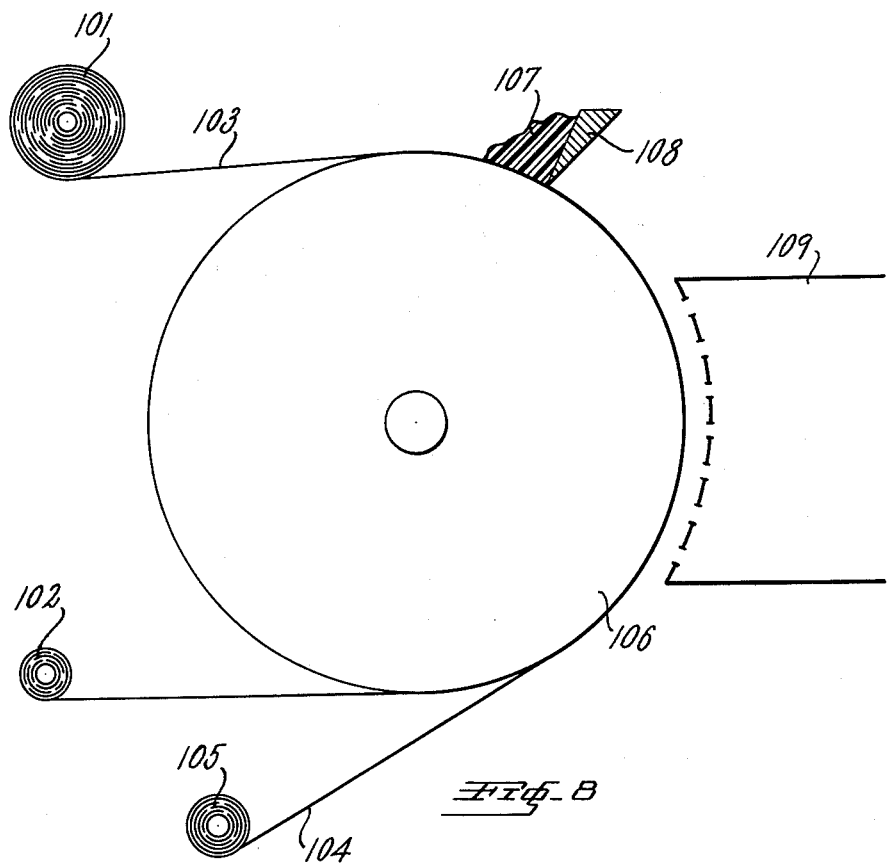

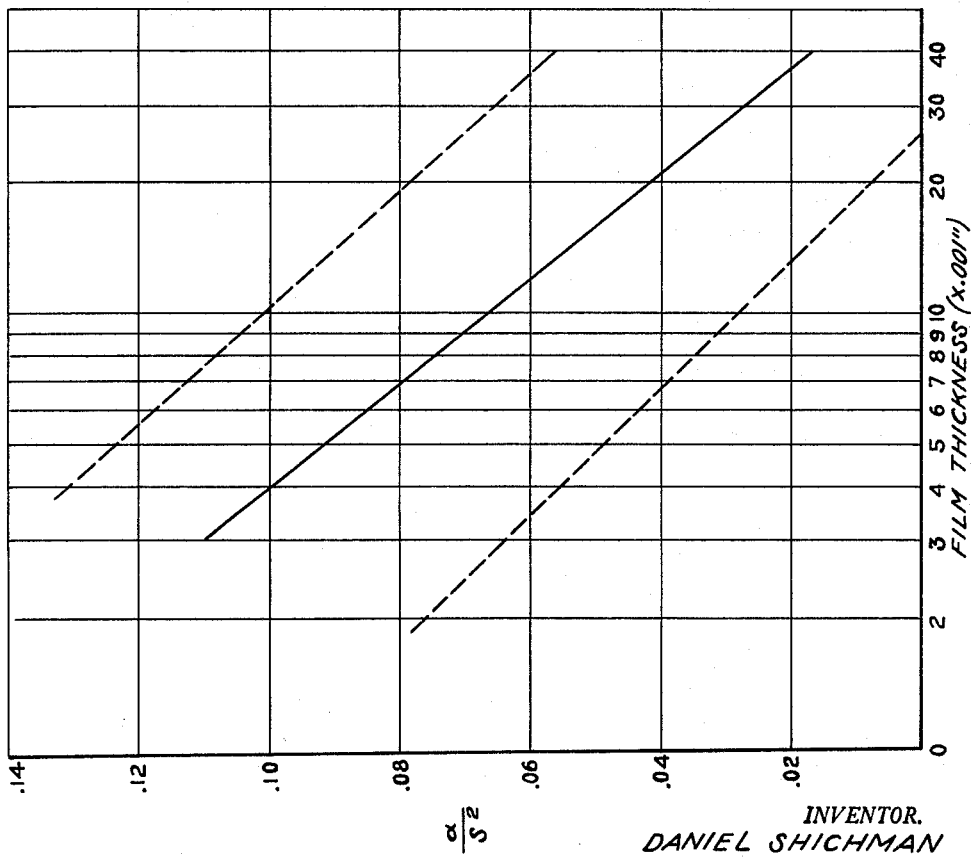

United States Patent Office

3,240,853
Patented Mar. 15, 1966

3,240,853
THERMOPLASTIC FILM MAKING
Daniel Shichman, Cedar Grove, N.J., assignor to United States Rubber Company, New York, N.Y., a corporation of New Jersey
Filed June 1, 1961, Ser. No. 127,416
6 Claims. (Cl. 264—216)

This invention relates to processes of forming thermoplastic films or sheets and for coating fabrics or other sheet materials with such films.

Thermoplastic film and sheet material designed for a variety of commercial and industrial uses has heretofore been manufactured in a number of different ways. One of the principal methods of forming such film involves the use of calendering rolls by means of which the source stock is shaped and brought to the desired thickness. This method of producing film is, however, beset by a number of substantial difficulties and disadvantages. The maximum width of sheet or film material that can be produced in this way is limited due to the fact that calendering rolls cannot be made more than about sixty inches in length without an adverse effect on their rigidity. It is also extremely difficult to form films of thickness greater than about twenty mils by means of calenders. Moreover, where multicolor effects are desired, extra passes of the stock through the calendar for each different color are generally required. Finally, viewed from the standpoint of economy of operating costs, calendars are undesirable because they are extremely expensive to manufacture, install and maintain.

Some types of thermoplastic films have heretofore also been formed by spreading a dope, or solution, of the film-forming material onto a moving surface such as a belt, drum or the like. The layer so formed is then moved sequentially through a heating device and a cooling device which serve, respectively, to remove solvent from the dope by evaporation and to solidify the residue of the dope so as to transform it into a film which can be stripped from the moving surface for storage or other treatment.

This method, too, suffers from a number of technical and operational drawbacks and disadvantages. Special precautions must usually be taken to prevent premature solidification of the dope at the point of its application to the moving surface. Moreover, the moving layer which is to be formed into film must be subjected to heat to evaporate the solvent from the film-forming material and at the same time must be passed through a stream of cool fluid, such as air, for the purpose of removing the evaporated solvent from the vicinity of the heated film. By its very nature, therefore, the apparatus for carrying out this known method of producing film is extremely complex and is not only expensive to set up but also requires relatively high maintenance costs. In addition, it is extremely difficult with such an apparatus to ensure that the proper heat transfer conditions for the entire expanse and thickness of the film are maintained at all stages of the operation and in all parts of the apparatus.

It is, therefore, an important object of the present invention to provide processes of forming thin film and sheet material in a manner free of the drawbacks and disadvantages inherent in known processes and apparatus of this type.

Another object of the present invention is the provision of novel and greatly improved film-forming process in which the raw material in the special form of a plastisol is deposited and spread onto a rotating drum on which it is first brought into a fused state and then cooled to a temperature at which it can be stripped from the drum in the form of the desired film.

A related object of the present invention is the provision of a process as aforesaid in which that surface of the layer of the film-forming material facing away from the drum is heated to a temperature well above the fusion temperature but below the deterioration temperature of the material, while the surface of the said layer which faces the drum is heated only to a temperature just above the fusion temperature of the material.

Still another object of the present invention is the provision of such a process in which the layer of film-forming material is brought to its desired temperature by being subjected to a jet of a hot gaseous fluid impinging on the outside surface at high velocity while the other, inside surface of the layer is in contact with a relatively cooler supporting surface, whereby there is maintained in the layer a predetermined temperature gradient, the lowest point of which is just above the fusion temperature of the material and the highest point of which is well above the said fusion temperature but below the deterioration temperature of the material.

In this connection, it is also an object of the present invention to provide a process of applying the required heat to the layer of film-forming material in such a way that a dynamic thermal equilibrium exists throughout the layer, whereby the temperatures at various points along the thickness of the layer reach desired respective levels and do not exceed them irrespective of the duration of heat application beyond the time required to reach the state of equilibrium.

Broadly, in accordance with the present invention the aforesaid objects are realized by virtue of the fact that the raw material is in the form of a plastisol, i.e. a dispersion of a suitable resin substance in fine particle form in a liquid plasticizer in which the particles of the resin substance are insoluble or only very slightly soluble at ordinary temperatures, but in which the resin substance will dissolve at elevated temperatures. For the purposes of the following description, the resin substance will be assumed to be polyvinyl chloride (P.V.C.), but it is to be understood that other polymers may be employed. It is also to be understood that an organosol is a form of plastisol.

Essentially, practising the present invention the plastisol is formed into a layer of the desired thickness on the outer surface of a coat of suitable material of relatively low thermal conductivity applied to the outer surface of a hollow, rotatable, water-cooled, metallic drum. As the drum rotates, the layer of plastisol is passed through a heating zone where a jet of hot gaseous fluid, such as air, flowing at relatively high speed impinges on it. By virtue of the fact that the thickness and thermal conductivity of the metal drum, the temperature of the cooling water, the thickness and thermal conductivity of the drum-coating material, and the temperature and rate of flow of the heating gas are all specifically predetermined in relationship to the composition, thermal characteristics and thickness of the palstisol layer, there is set up in the composite laminated structure consisting of the plastisol layer, the drum-coating material and the drum, a temperature gradient varying from a high point at the outer surface of the plastisol layer to a low point at the inner surface of the hollow drum. The thermal environment depends upon the temperature gradient and is maintained such that the temperature of the plastisol layer at the outer surface thereof is well above the fusion temperature but still below the deterioration temperature, while the temperature of the plastisol layer at the inner surface thereof, i.e. at the outer surface of the "insulating" or low-conductivity coating, is just above the fusion temperature. Moreover, the heat is applied in such a way that a dynamic state of thermal equilibrium is produced in the composite laminated structure, which ensures that the temperature at various distances into the thickness of the plastisol layer reach the prescribed levels but never exceed them regardless of the duration of the heat application.

In this manner, the entire plastisol layer is fused in a few seconds or less and transformed from a two-phase dispersion into a single-phase solution of the polyvinyl chloride in the plasticizer, which solution, upon cooling, will constitute the desired film. As the drum rotates further and leaves the heating zone, heat is extracted from the film by the cooling water through the insulating coat and the drum at a controlled rate, which in a few seconds cools the film sufficiently to permit it to be stripped from the drum for storing or further treatments. The entire operation is, thus, carried out at relatively high speeds, leading to substantial increases in production rate and capacity as well as in manufacturing economies.

The principles of the present invention as just outlined can also be applied to the coating of fabrics or other woven or non-woven sheet materials with such thermoplastic films. In general, this requires bringing the sheet material to be coated into contact with the film while it is still soft just as the latter emerges from the heating zone. Some of the fibers of the sheet material will thus penetrate the top surface of the film, and when the latter solidifies upon cooling in the manner set forth, the film and sheet material will be securely bonded to one another.

The foregoing and other objects, characteristics and advantages of the present invention will be more fully understood from the following detailed description thereof when read in conjunction with the accompanying drawings, in which:

FIG. 1 is a somewhat schematic, partly sectional elevational view of a film-forming apparatus for use in accordance with the principles of the present invention;

FIG. 2 is a sectional view taken along the line 2—2 in FIG. 1;

FIG. 2a is a schematic representation of a composite laminated structure employed in practising the present invention, indicating some of the pertinent physical and thermal properties thereof;

FIGS. 3 and 4 are graphs showing two sets of operating conditions for the formation of a pair of film of different thickness in accordance with the principles of the present invention;

FIG. 6 is a diagrammatic illustration of such an apparatus as employed for the production of film embossed on one surface thereof; and FIG. 7 is a similar diagrammatic illustration of the apparatus as employed in producing film embossed on both surfaces thereof.

FIG. 8 is a diagrammatic illustration of a modified apparatus in which insulating paper is wound over the drum replacing the insulative drum coating.

FIG. 9 is a graph useful in determining the operating parameters of this invention.

Figure 4:
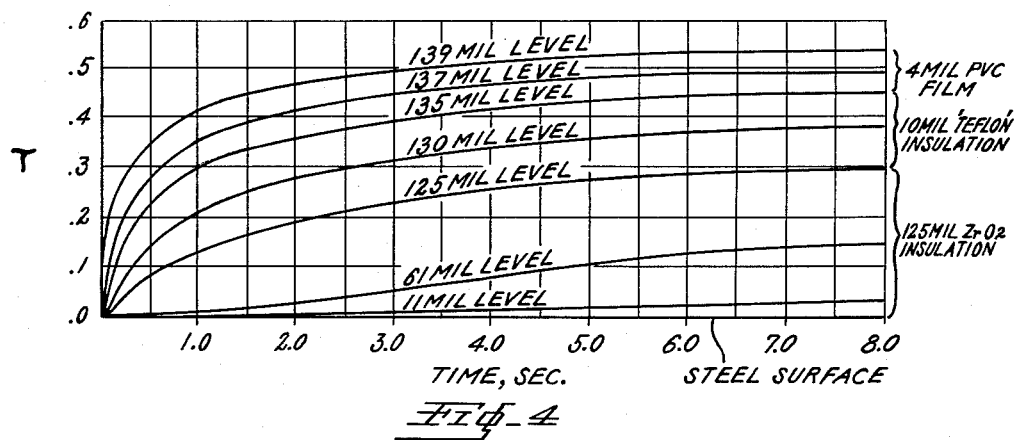

Referring now more particularly to FIGS. 1 and 2, it will be seen that the apparatus utilized to practice the process of the present invention comprises a drum 10 rotatably journaled by means of shafts 10a and 10b in suitable bearings 11 and 12 supported in a pair of spaced vertical mounting plates or standards 13 and 14. The drum 10 is hollow and comprises essentially a cylindrical steel body 15 the opposite ends of which are closed by means of end plates 16 and 17 bolted or welded to the body 15 at the opposite ends of the latter. On the outer surface of the tube or body 15 there is provided a smooth-surfaced coating 18 of a suitable low thermal conductivity material the purpose and construction of which will be more fully explained hereinafter. The interior of the drum 10 communicates via pipes 19 and 20 extending through the shafts 10a and 10b, respectively, with conduits 19a and 20a through the intermediary of rotary couplings 21 and 22 so that water or other suitable cooling fluid W may be circulated through the drum. The shaft 10b supporting one end of the drum carries a sprocket wheel 23 about which passes a drive chain or belt 24 which also passes about the output sprocket 25 of a motor-driven speed reducer 26, whereby the drum may be driven at any selected rotary speed.

Positioned above the drum 10 is a doctor blade or strike-off member 27 the height of which relative to the outer surface of the drum, i.e. relative to the outer surface of the coating 18, may be adjusted by any suitable means (not shown) in accordance with the desired thickness of the film to be formed. As can be seen from FIG. 1, the doctor blade 27 is preferably positioned somewhat beyond the vertical center plane of the drum, as viewed in the direction of rotation of the latter, to provide a trough or trench in which a mass 28 of the plastisol to be formed into the film may be accumulated. The plastisol is initially contained in a tank or like vessel 29 supported on an overhead beam structure 30 or the like above the drum 10 and may be fed into the trough formed behind the doctor blade 27 by means of a pipe or other conduit 31 in which is arranged a suitable control valve 32. It will be readily understood that rotation of the drum 10 in the direction of the arrow A thus causes a layer 28a of the plastisol to be deposited on the outer surface of the coating 18. The adjustability of the doctor blade enables layers as thin as 1 mil (0.001 inch) and as thick as 60 mils (0.060 inch) to be produced, a range of film gauges completely unattainable with calenders. There is also no practical limit to the film width obtainable, since the trench arrangement does not suffer from any structural rigidity limitations as to calender.

Located at one side of the drum 10 and beyond the doctor blade 27 (as viewed in the direction of rotation of the drum) is a heating unit 33 for fusing the plastisol layer 28a. The heating unit 33 comprises an outer enclosure 34, hereinafter sometimes referred to as a heating box, having top and bottom walls 34a and 34b, side walls 34c and 34d, and rear end wall 34e. The enclosure 34 thus is closed on all sides except at the end immediately adjacent the drum 10. Within the enclosure 34 there is arranged a jet or nozzle member 35 which has the form, in the illustrated embodiment of the invention, of a substantially rectangular body having top and bottom walls 35a and 35b, side walls 35c and 35d and a rear wall 35e. The top and bottom walls of the jet body carry respective sets of wheels or rollers 36 engaging the top and bottom walls 34a and 34b of the enclosure 34. The jet 35 is thus mounted for reciprocal movement within the enclosure 34.

At its front end, the jet body is provided with a perforated orifice plate 37 through which a gaseous heating fluid can flow toward the drum 10, as will be more fully described presently. The orifice or jet plate 37 is, as clearly shown in FIG. 1, arcuate in cross-section. According to the preferred aspect of the present invention, the curvature of the plate 37 is the same as that of the drum 10, but it will be understood that the curvature of the orifice plate may be different from that of the drum, varying therefrom either symmetrically or asymmetrically relative to the horizontal center plane of the drum depending on the operating conditions sought to be established.

The rear end wall 35e of the jet carries a coupling or like element 38 which is connected to a rod 39 connected in turn to a piston 40 arranged within the cylinder 41 of a double-acting pneumatic motor. The cylinder 41 is located exteriorly of the enclosure 34 and rigidly connected to the end wall 34e of the latter by means of bolts 42. The piston 40 is connected at that face thereof remote from the rod 39 with another rod 43 which extends through a bushing 44 connected to the free end of the cylinder 41. The outermost end of the rod 43 is threaded, as shown at 45, and carries an internally threaded nut 46 provided with a handwheel or other manipulating means 47. It will be seen that the nut 46, bushing 44 and rod 43 thus provide means for a fine adjustment of the stroke of the piston 40 within the cylinder 41 so as to provide for a correspondingly fine adjustment of the minimum distance from the front surface of the jet orifice plate 37 to the outer periphery of the drum 10, and in particular to the outer surface of the plastisol layer 28a within the confines of the front end of the enclosure 34.

The jet 35 is provided in the side wall 35d thereof with an elongated, longitudinally extending slot 48 into which extends one end 49a of a conduit 49 stationarily extending through the side wall 34d of the enclosure 34. The conduit 49 communicates at its other end 49b with the outlet end of a combustion or heating chamber 50 in which is arranged an open flame gas burner 51 to which air and commercial illuminating or natural gas may be fed in desired quantities. The inlet end of the chamber 50 communicates with the discharge side of a blower 52 rigidly mounted, merely by way of example, on the beam structure 30. The intake or suction side of the blower 52 communicates through chamber 50 with one end 53a of a conduit 53 the other end 53b of which communicates with the interior of the enclosure 34 adjacent the rear end of the latter.

From the foregoing it will be seen that there is provided a fluid circulation arrangement 49 to 53 by means of which the gaseous fluid, preferably air, heated in the chamber 50 is fed via conduit 49 into the jet 35 from which it leaves via the orifices in the perforated plate 37 and subsequent to impinging on the drum 10 or the plastisol layer 28a supported thereon is drawn past the exterior of the jet to the rear of the enclosure 34 from which it is exhausted via the conduit 53 and returned by the blower 52 to the chamber 50 for reheating.

As clearly shown in FIG. 2, the external side of side dimension of the jet body 35 is substantially the same as the internal side to side dimension of the enclosure 34, so that the jet is received in the enclosure with a snug, sliding fit. If desired, a sealing gasket may be carried by the jet body 35 at the exterior thereof and around the slot 48. This arrangement, in conjunction with the provision of the slot 48 in the sidewall 35d of the jet body 35, ensures not only that the heating fluid circuit is complete at all times regardless of the position of the jet within the enclosure, but also that no leakage of heating fluid from the interior of the jet body through the slot 48 can occur. Moreover, the utilization of such a circulation system, which may be combined with any suitable temperature sensing mechanism (not shown) controlling the operation of the burner 51, renders the entire operation highly economical from the standpoint of heat consumption. It is self-evident that it would be much more expensive and require a greater power input to heat the plastisol layer by means of electrical or like heating devices, which are in any event disadvantageous from a technical and operational standpoint as will be explained more fully hereinafter.

Due to the fact that an open flame gas burner 51 is employed as the means for heating the stream of air to be impinged against the plastisol layer, it will be understood that this stream of hot fluid will consist not only of air but also of some combustion gases. Inasmuch as there is bound to be some leakage of spent fluid from the front end of the enclosure 34 through the gaps 54 existing between the front end of the enclosure 34 and the outer surface of the plastisol layer formed on the drum 10, there is provided in accordance with the present invention means for withdrawing such escaped fluid from the vicinity of the apparatus so that the operators of the machine will not be forced to breathe in the possibly harmful gases. To this end, there is provided adjacent the top and bottom of the front end of the heating box or enclosure 34 a pair of suction chambers 55 and the interiors of which communicate with an exhaust conduit 56 connected to the intake of a suction fan or like blower device 57. In this manner gases escaping through the gaps 54 will be drawn into the exhaust chambers 55 and fed by the blower 57 into the outside atmosphere at a suitable location remote from the apparatus. To compensate for lost fluid, means may be provided to admit small quantities of air into the circulation system, e.g. a pressure responsive check valve or the like.

It will further be appreciated that the heat of any gases escaping from the enclosure 34 must be prevented from reaching the plastisol 28 accumulated within the trench or trough defined by the doctor blade 27. To this end, there is provided immediately adjacent the doctor blade 27 and at the rear side thereof (as viewed in the direction of rotation of the drum 10) a water cooled baffle 58 which may be vertically adjustable jointly with the doctor blade. For the sake of simplicity of manufacture, the baffle 58 is constructed of an ordinary length of pipe, but it will be understood that other arrangements may be employed.

Journaled in suitable brackets or bearing members 59 affixed to the mounting plates 13 and 14 is a stripping roller 60 by means of which the cured film 28b may be stripped from the drum 10. The stripped-off film may be fed to a suitable take-up spool or drum 61 rotatably supported in any suitable manner, for example as shown at 62, and driven either manaully or by a drive motor (not shown), the latter being especially preferred if it is desired to maintain a predetermined tension on the film 28b.

A multi-color effect can be accomplished by this invention, by printing on the drum face with the color ink desired before the plastisol is applied. When the film is stripped from the drum, it will contain the printing ink within its surface.

The operation of the described apparatus according to the present invention will best be undesrtood from the following description of the novel process of forming film in accordance with the hereinbefore stated objects of the present invention.

Generally, it must be realized that the film-forming process of the present invention is mainly characterized by the fact that thermodynamic principles and considerations, applied in dependence on the intended thickness of the film to be produced, determine the ultimate construction and operational conditions of the apparatus and in particular of the drum 10 and heating unit 33 thereof. As will be readily understood, in view of the fact that high operational speeds or production rates are important objects of the invention, it is essential that any heat transfer to and through any given portion of the film-forming material layer must be accomplished in the smallest possible interval of time consonant with the raising of all of said layer portion to at least the fusion temperature of the material and with the establishment of a dynamic state of thermal equilibrium throughout said layer portion for reasons previously stated.

Before proceeding with the description of the process, it appears advisable to take special note of two aspects of thermal properties of heat-transmitting media in general. First, for any given homogeneous medium, the rate of transfer of heat through a slab of the same from a heat source to a heat sink is given by the relation $$\frac{Q}{t} = \frac{UA\Delta T}{d}$$

where Q is the quantity of heat transferred, $t$ is the time interval, A is the area of the slab of the medium, $\Delta T$ is the mean temperature difference between the respective boundary surfaces of the slab adjacent the heat source and sink, $d$ is the thickness of the slab, and U is the coefficient of heat transfer or specific thermal conductivity of the medium. Where such a medium is not homogeneous, of course, $d$ is the overall thickness and U is the overall or composite coefficient of heat transfer. Second, any two points in the medium spaced different distances from the heat source, along the thickness $d$, will be at different temperatures, the point nearer the source being at a higher temperature than the point nearer the sink. Thus, in the space between these two points there exists a temperature gradient or change of temperature with distance as measured from the point nearer the source to the point nearer the sink. A suitable choice of the thickness of the medium predetermines, therefore, the temperature thereof adjacent the sink for any given temperature of the heat source at the junction of the latter with the medium.

The application of these principles in the implementation of the objects of the present invention will now be explained, reference being had in particular to FIGS. 1 and 2a.

As hereinbefore stated, the body 15 of the drum 10 is metallic, and preferably is made of steel, aluminum, copper or a like material having a relatively high thermal conductivity. The drum body may be specially constructed for use in the intended manner or may, for instance, be constituted by a length of standard commercially available pipe. The outer surface of the drum is covered by a thin coat 18 of a relatively low thermal conductivity material. This material may be ceramic, polyfluorohydrocarbon, or other polymers or resins known to be capable of withstanding temperatures in excess of 450° and which can be made into thin coatings. Examples of the resinous materials are certain phenolic resins generally known as high frequency insulation, and certain polymerized polyfluorohydrocarbons such as are sold by E. I. du Pont de Nemours & Company under the trademarks "Teflon" and "Viton A" and by the M. W. Kellogg Company under the trademark "Kel-F." Representative ceramic materials are zirconia (zirconium oxide) and aluminum trioxide. The coat 18, which is intended to serve as a supporting surface for the film to be produced, may be formed or deposited on the drum in any suitable manner, as by a spraying process or by a liquid film depositing process, but for reasons which will presently become clear, care must be taken that the coat 18 is of uniform thickness throughout. The thickness of the coat 18 may be as little as 2 mils (0.002 inch) and as much as 200 mils (0.200 inch) depending on the type of material employed and on the operating conditions sought to be attained.

When the drum 10 is rotated, there is, of course, deposited on the outer surface of the coat 18 a layer 28a of the plastisol or film-forming material previously retained in the trough or trench defined by the top of the drum and the rear face of the doctor blade 27. At this time, consequently, the drum wall 15, the coat 18 and the plastisol layer 28a make up a composite laminated structure which is schematically illustrated in FIG. 2a and constitutes the previously referred to heat transfer medium having an overall thickness $d$ and an overall coefficient of heat transfer U.

As the drum 10 rotates further, the portion thereof carrying the plastisol layer 28a enters the heating zone defined by the open end of the heating unit 33. While within the confines of the heating unit, the plastisol layer is subjected to the impinging action of a high velocity jet of a hot gaseous fluid, preferably air, as indicated by the short horizontal arrows in FIG. 2 and by the short vertical arrows in FIG. 2a. The temperature of the hot air, which flows at a linear velocity ranging from about 4,000 feet per minute to about 10,000 feet per minute, is between about 500° F. and about 850° F. and preferably between about 650° F. and about 800° F. This temperature is indicated by $T_1$ in FIG. 2a.

The interior space of the drum 10 is filled to the extent of about one-third to one-half with water W (or any suitable, preferably liquid, cooling fluid) maintained at a temperature between about 50° F. and about 100° F. The temperature of the drum wall 15, absent all other factors, is indicated in FIG. 2a by $T_2$ and will ordinarily be the same as the temperature of the water for all practical purposes. Theoretically, of course, the temperature at the inner, water-contacted surface of the drum wall 15 will be different from the temperature at the outer surface of the drum wall 15, but in the practice of the present invention this difference is negligible due to the high thermal conductivity of the metal of which the drum is made. For optimum operational conditions, the temperature of the water admitted into the drum 10 is so controlled that the temperature $T_2$ at the outer drum wall surface is 100° F. A table of definitions follows:

$T_1$ = Temperature of the hot gas stream, ° F.
$T_2$ = Temperature of the cooling liquid and, by approximation, of the metal wall of the drum, ° F.
$T_3$ = Temperature at any point in the plastisol layer or layer or "insulating" layer that is being referred to at the moment, ° F.

Thus, there is established within the laminated structure 15–18–28a a non-linear temperature gradient determined in essence by the difference between $T_1$ and $T_2$ and by the thermal properties of the materials of which the laminated structure is composed. Accordingly, at any given point within the laminated structure the temperature will be determined by the distance of that point from the opposite boundary faces of the structure and the relative thermal properties of the components of the laminate. For the purposes of the present invention, one of the critical features is that the temperature at any given point of the plastisol layer 28a, indicated by $T_3$ in FIG. 2a must reach a temperature above the fusion temperature of the film-forming material. Specifically, at the inner face of the plastisol layer, $T_3$ must be just above the fusion temperature, while at the outer face of the layer, $T_3$ must be much higher but still well below the deterioration point of the film-forming material. It will be understood, of course, that for the production of films of different thicknesses the attainment of the just-mentioned conditions requires the use of respective "insulating" coats 18 of correspondingly different thicknesses and/or compositions, inasmuch as for practical and economic reasons the thickness and composition of the drum wall and the rate of flow and temperature of the heating gas are constants. This will be more fully explained presently.

The use of a jet of hot gas or air as the means for heating the plastisol constitutes another of the critical features of the present invention. It must be remembered that economy of operation and thus maintenance of maximum production rates are primary objects of the invention. Since the quantity of film produced is a direct function of the speed of rotation of the drum, it is obviously most desirable to transfer heat into the plastisol layer as rapidly as possible, to ensure thereby that a suitably high drum speed can be employed. As already set forth hereinbefore, the rate of heat transfer $Q/t$ (expressed in B.t.u./hr.) is proportional to the term $UA\Delta T$. For any given drum, however, A (expressed in sq. ft.) is basically constant and at best can be increased only to a limited extent, while the maximum attainable difference between $T_1$ and $T_2$ (expressed in ° F.) is also limited by practical considerations. This necessitates making the factor U (expressed in B.t.u./hr./sq. ft./° F.) as large as possible. If the heat is supplied by means of electrical heating elements or by heat-radiating devices such as lamps, not only is the apparatus as a whole rendered more complex and expensive, but it is found that the value of U attainable, ranges only from about 2 to 10. This is apparently due to the fact that a layer of stagnant air collects over the layer surface and acts as an insulating medium between the heat source and the film-forming layer. However, this drawback is eliminated by the present invention through the use use of a high velocity jet of air as the heating medium which, due to the turbulent flow conditions created at the plastisol layer surface, dispels the strata of stagnant insulating air. In this manner, the present invention makes it possible to obtain values of U as high as about 50 to 60 which are necessary to enable the sought for goal of a maximum possible production rate, and fusion of the entire film without decomposition of material closest to the heat source to be attained.

It is to be particularly noted, in this connection, that it is the use of a high velocity jet of gas or air impinging on the plastisol layer surface which leads to the highly advantageous results mentioned above. Stated in other words, the heating fluid must flow at high speed in a direction which is preferably normal to the layer surface and under any circumstances is not inclined more than about 60° to the normal. Heating fluid flowing in a direction substantially tangential to the layer surface is found to be incapable of yielding the desired effects and high U values, probably due to the fact that this type of flow leaves the insulating layer of stagnant air adjacent to the plastisol surface undisturbed. For probably a very similar reason, air velocities below about 4,000 feet per minute are not to be employed as it is found that in this range that heat transfer coefficient U falls off very rapidly. On the other hand, air flow speeds above about 10,000 feet per minute (somewhat higher for more viscous plastisols) are also generally not advantageous (despite a possible increase of the heat transfer coefficient U) due to the fact that at such velocities rippling of the plastisol layer occurs which leads to the formation of waviness in the film. The viscosity of the plastisol is between 6,000 and 100,000 centipoises. Plastisols of lower viscosity than 6,000 cps. tends to ripple too easily under the air jet. Above the stated maximum, it is not possible to strike off the plastisol to the desired thickness. Plastisols having viscosities near the top of the stated range are useful only for making films greater than 25 mils thick.

Returning now to the actual film-forming process, the fused plastisol layer while within the confines of the heating unit 33 is transformed into an as yet unsolidified but fully cured film. This result, i.e. the "solution" state of the film, is not affected in any way by the continued application of heat to the film by the hot air jet, inasmuch as a state of thermal equilibrium is established within the laminated structure soon after the plastisol layer enters the heating zone. Thus, overheating and consequent deterioration in the physical properties of the film are not possible. As soon as the film leaves the heating zone, heat is extracted by the cooling medium W from the film at an accurately controlled rate which is determined by the same thermal and physical properties of the film-forming material, the insulating coat, the drum walls and the cooling medium which determine the previous rate of heat build-up in the laminated structure. After a brief cooling period, therefore, the film 28b is fully solidified and can be readily stripped from the forming drum 10 with the aid of the roller 60. The importance of the arrangement according to the present invention will now be further appreciated. If, for example, the inner film surface were in direct contact with the drum surface, its temperature would be below the fusion point and the unfused plastisol layer portion would remain pasty and difficult to strip from the drum. If, on the other hand, the drum were at the fusion temperature (absent the coat 18), the film would not solidify and again it would stick to the drum and resist easy stripping.

The technique for designing an insulating coating for a drum to be used in the apparatus of the instant invention will now be described with reference to FIGURE 9. This figure contains a plot of the function of $\alpha/S^2$ against the log of film thickness (i.e. of the plastic film to be made on the drum); $\alpha$ in turn is defined as the function $$\frac{k}{\rho C_p}$$

of the layer of insulating material, wherein $k$ is the coefficient of thermal conductivity, in B.t.u. per sec. per sq. ft. per °F per ft., $\rho$ is the density of the insulating material in lbs. per cubic foot, and $C_P$ is the specific heat of the insulating material in B.t.u. per lb. per °F. S is the thickness of insulating material, in inches, to be applied to the drum.

To design a coating for a drum to be used to manufacture film 10 mils. (0.010 inch) thick a line is extended vertically from an abscissa value of 10 on the graph of FIG. 9. This line will intersect the solid line at an ordinate of 0.066. This means that any coating for which the properties $\alpha/S^2$ *h*appen to be 0.066 will be optmum for the task of making film of 10 mil thickness The material to be used for the insulating coating must now be selected, so that $\alpha$ may be calculated. If Teflon is chosen, then from its properties $\alpha$ is calculated to be $$\alpha = \frac{k}{\rho C_P} = \frac{0.395 \times 10^{-4}}{136.4 \times 0.25} = 0.01153 \times 10^{-4} \text{ sq. ft. per. sec.}$$

or $$0.01155 \times 10^{-4} \times 144 = 1.66 \times 10^{-4} \text{ sq. in. per sec.}$$

Since, from the graph in FIG. 9, $\alpha/S^2$ was found to be 0.066.

$$S = \sqrt{\frac{1.66 \times 10^{-4}}{0.066}} = 0.0501 \text{ inch.}$$

Thus, a Teflon coating of 0.0501 inch thickness on the drum will be optimum for the manufacture of 10 mil thick film.

Whereas the solid line on the graph of FIGURE 9 represents the optimum design curve for the thermal properties of the insulating coating to be used, these are not the only coatings that will be operable in the device of the invention. The range of thermal properties of coatings that may be used to make film of the desired thickness are bounded by the two broken lines on the graph. Thus, it will be apparent that any coating having the thermal property of $\alpha/S^2$ between 0.03 and 0.10 may be used to make film of 10 mil thickness. Conversely, it will also become clear upon inspecting the graph that when the drum has an insulating coating with thermal property $\alpha/S^2$ of 0.066, which is optimum for making 10 mil thick films, that any film of thickness from just under 3 mils to 28 mils may be made upon this drum.

The design lines on the graph are each discontinued at the abscissa corresponding to a 40 mil thickness. This is because the thickest film that can be made by the ordinary application of the invention is 40 mils. For thicker films, however, this variation of the invention may be used: the doctor blade 27 is set to strike off the thickness of plastisol which will give film of the desired thickness. The film that is obtained is stripped from the drum, reversed, and passed under the hot air jet again so that the side of the film that was adjacent the roller during the first pass is now facing the hot air jet. Thus that portion of the film that was improperly cured during the first pass through the hot air jet is fully cured during the second pass. Films up to about 60 mils in thickness can be prepared in this fashion.

The following examples, having reference to FIGS. 3 and 4, will more clearly illustrate the nature of the invention.

*Example 1*

For preparing a 12 mil vinyl film, a steel drum having an outer diameter of 15 inches and a length of 36 inches is provided with a coat of "Teflon" resin (polytetrafluoroethylene) 0.018 inch thick. A.P.V.C. plastisol with a fusion temperature of about 300° F. is formed into a layer 0.012 inch thick on the drum as the latter rotates past the doctor blade 27, in the manner described hereinbefore. After the layer enters the heating zone, it is subjected to a stream or jet of air flowing normal to the layer surface at a linear speed of 6,000 feet per minute and at a temperature of 800° F. The drum surface is maintained at a temperature of 100° F.

A plot of the temperature conditions existing at various levels in the composite laminated structure against time is shown in FIG. 3. The junction of the outer surface of the "insulating" coat and the inner surface of the plastisol layer is designated as the 18 mil level, measured outwardly from the steel drum surface. Under the requirements of the present invention, every part of the layer must be brought to at least the fusion temperature in the shortest possible time. From the graph it can be seen that even the part of the layer furthest from the heat source takes only about two and a half seconds to reach this temperature, as indicated by the intersection of the 18 mil curve with the fusion temperature ordinate (shown in broken lines). It will also be seen from FIG. 3 that shortly after this time point the curves level off to approximately zero slope. Thus, even overexposure of the plastisol layer to the heating action of the air jet after the fusion temperature has been reached will not cause a further appreciable temperature rise and consequent possibly destructive overheating of the now fully cured vinyl film.

As a consequence of the foregoing it can be understood that in carrying out the process according to the present invention the rotational speed of the drum can be set sufficiently high as to cause each portion of the plastisol layer to traverse the heating zone in a period of from 3 to 4 seconds without any danger that any part of the layer will not be completely fused. Morever, as soon as the formed film leaves the heating zone, it begins to lose heat at a controlled rate substantially equal to the previous rate of heat influx. Thus, the film will be sufficiently cooled after another period of 3 to 4 seconds to permit its being stripped from the forming drum.

*Example 2*

It is desired to produce a 4 mil vinyl film. A steel drum of the same type as employed in the process of Example 1 is for this purpose coated with a multi-layer "insulating" coat consisting of a 0.125 inch thick layer of zirconia ($ZrO_2$) and a superposed 0.010 inch thick layer of "Teflon" resin. Onto the outer surface of this coat is deposited in the described manner a 0.004 inch (4 mil) thick layer of the same P.V.C. plastisol as was used in Example 1. The drum temperature, the rate and direction of flow of heating air, and the temperature of the heating air are the same as in Example 1.

FIG. 4 shows a plot of temperature conditions in the laminated structure against time, this graph differing from that shown in FIG. 3 in that the ordinate is calibrated in terms of a temperature factor or quotient $\tau$ defined by the relation $$\tau = \frac{T_3 - T_2}{T_1 - T_2}$$

wherein $T_1$, $T_2$ and $T_3$ are the temperatures referred to hereinabove in connection with FIG. 2a. For the plastisol presently under discussion, the value of $\tau$ is approximately 0.285 as indicated in broken lines in FIG. 4, and it can be readily seen that even the lowest part of the plastisol layer, identified as the 135 mil level, will reach its fusion temperature in less than 1 second. For this thickness of film, therefore, a drum speed can be selected which will traverse each layer portion through the heating zone in a curing interval of from 1 to 2 seconds. By the same token, it will take only about 1 to 2 seconds to solidify the cured film 28b after it leaves the heating zone so as to permit stripping of the film from the drum 10. The function $\tau$ (tau) is useful because it relates all other temperatures to drum temperature. In effect, it is a system of temperature measurement in which the drum temperature is taken as zero.

It is to be understood, of course, that different multi-layer coats 18 may be employed for the production of a variety of thicknesses of thermoplastic films. Thus, vinyl films have been formed using "insulating" coats composed, for example, of 6 mil layers of "Teflon" resin with 50 and 200 mil layers of zirconia, respectively, 125 mil layers of zirconia with 2 and 10 mil layers of "Teflon" or with a 6 mil layer of a suitable phenolic resin, respectively, and of a 15 mil layer of "Viton A" resin with a 50 mil layer of zirconia. A 25 mil film of polyvinyl chloride having good physical properties has been formed using an 80 mil layer of zirconia alone.

Figure 5:
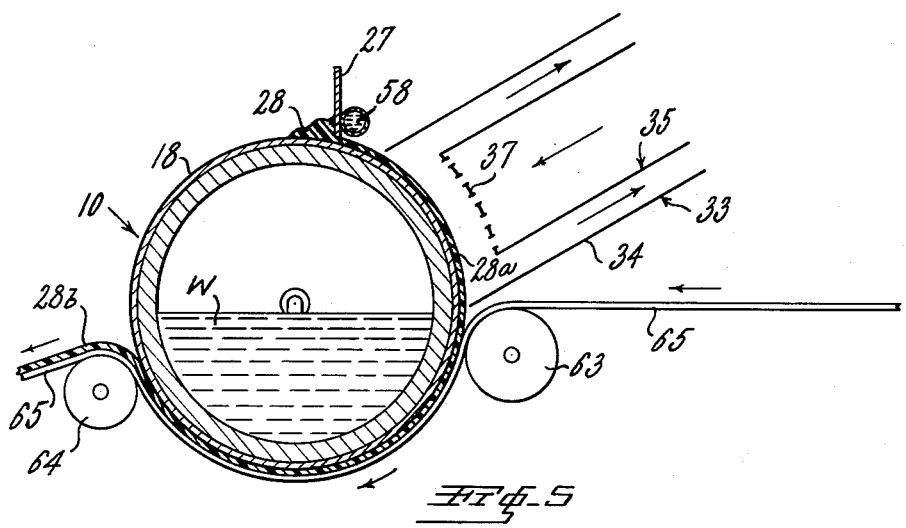
FIG. 5 is a diagrammatic illustration of an apparatus embodying the principles of the apparatus of FIG. 1 and adapted for coating the film onto a sheet of fabric.

Referring now to FIG. 5, it will be seen that the principles of the present invention may be utilized in coating fabrics or other sheet materials with thermoplastic films. To this end, there are positioned adjacent the film-forming drum 10 two rollers 63 and 64. These rollers are spaced from one another peripherally of the drum, with the roller 63 being located in close proximity to the exit part of the heating zone defined by the merely schematically indicated heating unit 33. As in the case of the doctor blade or strike-off knife 27, means (not shown) are located between the front end of the enclosure 34 and the roller 63 to protect the fabric or sheet material 65 against heat escaping from the enclosure 34. Such insulating means may be omitted, however, if a certain amount of preheating of the fabric or sheet material is desired. The plastisol layer 28a is formed on the rotating drum with the aid of the doctor blade 27 and is then heated by a jet of hot air or like gaseous fluid flowing at high speed, in the same manner as described hereinbefore. Concurrently, the base or uncoated fabric or sheet material 65 is fed from the supply spool thereof (not shown) around the rollers 63 and 64 as shown, between the respective rollers and the drum 10. The rollers 63 and 64 are preferably radially adjustable relative to the drum to accommodate fabric or sheet materials of different thicknesses.

It is apparent, therefore, that when the fabric or sheet material 65 passes between the drum 10 and the roller 63, it comes into contact with the still soft outer surface of the film 28b, whereby some of the fibers of the fabric or sheet material become embedded in the thermoplastic film. As the film and fabric now move with the drum toward the roller 64, the film is cooled and solidified, as previously explained, and a strong bond between the film and the fabric or sheet material is thus effected, enabling the film to be stripped from the drum 10 when the coated material is passed around the roller 64. A similar procedure may subsequently be followed if it is desired to coat also the other surface of the fabric or sheet material 65.

The advantages of a coating process as just described will be readily appreciated. Primarily, the overall coated fabric production rate is now as high as the rate of film production which, in accordance with the present invention, is much higher than has heretofore been attainable.

Further, it must be remembered that by means of known processes and apparatus for this purpose the thermoplastic material is first specially spread on the fabric or sheet material, and then the entire combination is passed through a tunnel oven or like heating device. This entails the considerable disadvantage that the fabric or sheet material must also be exposed to the elevated temperatures existing in the oven for prolonged intervals of time, as a result of which the fibers or structural characteristics of the fabric or sheet material itself may be adversely affected, while at the same time the thermoplastic material may completely impregnate the fabric or sheet material rather than remain on the surface thereof as a coat. No such drawbacks can possibly be encountered when the coating operation is carried out as taught by the present invention.

Referring now to FIGS. 6 and 7, it will be seen that film embossed on one or both faces may also be produced by means of an apparatus and process conforming to the principles of the present invention. For a one-face embossing it is merely necessary to position an embossing roller 66 adjacent the exit part of the heating zone (see FIG. 6) so that the said roller presses against the outer surface of the unsolidified film 28b to thereby form in the film the desired design which will become set therein as the film is cooled by the heat sink-constituting water W circulating through the drum. Again, means (not shown) may be positioned between the roller 66 and heating unit enclosure 34 to prevent heat from the latter from reaching the said roller.

The arrangement for a two-face embossing operation (see FIG. 7) is similar to that shown in FIG. 6 and differs therefrom in that there is positioned adjacent the stripping roller 60 a second embossing roller 67 in such a manner that the film 28b can pass therebetween upon being stripped from the drum 10. In view of the fact, however, that the film at this time is already substantially fully solidified, it is necessary to provide an auxiliary hot air jet-type heating device 68 (indicated only schematically in FIG. 7) adjacent the stripping roller 60 and in position to heat and soften the as yet unembossed surface of the film. The heating device 68 is essentially similar to the unit 33 but need not, of course, deliver heating fluid at the same high temperature as the unit 33.

A variation of this invention is shown at FIGURE 8 where the plastisol is applied to a paper 103 let off from roll 101 and which is applied over an uncoated roll. The paper has similar insulating properties as the insulated coating 18 which is applied to the roll and bonded thereto as shown in FIGURE 1. This paper rotates as the uncoated drum 106 rotates. The plastisol 107, and doctor blade 108 are formed as previously described in connection with FIGURE 1 as is the jet heater 109. The thickness of the let-off paper 103 may be determined in the same manner as the thickness of the coating to be formed over the roll. The film 104 which is formed by this embodiment is wound over a take-up roll 105. The paper is wound up on take-up roll 102, and may be reused.

An example of the type of paper which may be used as in insulated paper 103 is ordinary kraft paper.

Having thus described my invention, what I claim and desire to protect by Letters Patent is:

1. The process of producing thermoplastic film, comprising the steps of spreading a plastisol of the film-forming material into the form of a thin layer having the desired thickness of the ultimate film onto a rotating drum consituted by an inner high thermal conductivity metallic base and an outer insulating coating of low thermal conductivity material of predetermined thickness, and subjecting the moving composite laminated structure constituted by said layer, said coating and said base to a temperature differential to establish in said layer a temperature gradient ranging from a temperature substantially above the fusion temperature of said film-forming material but below the deterioration temperature thereof at the outermost surface of said layer remote from said coating to a temperature just above said fusion temperature at the inner most surface of said layer adjacent said coating, by impinging on the exposed surface of said layer a stream of hot gaseous fluid at an angle inclined less than approximately 60° to a plane normal to said layer and at a linear velocity between approximately 4,000 and 10,000 feet per minute and by extracting heat from the opposite surface of said layer, said step of extracting heat from said layer being continued in a region of said coating and said base substantially displaced from the region of impingement of said hot gaseous fluid to solidify said layer while said layer is on said supporting surface.

2. The process of claim 1, further comprising the steps of circulating a cooling medium at a temperature substantially below said fusion temperature through said drum in heat exchange relationship with said base, the respective temperatures of said cooling medium and said gaseous fluid defining said temperature differential, and the respective thicknesses and coefficients of thermal conductivity of said base and said coating being so selected, with respect to the coefficient of thermal conductivity, density and intended thickness of said plastisol layer and with respect to the heat transfer capacities of said gaseous fluid and said cooling medium, that after a predetermined time interval a state of dynamic thermal equilibrium is established in said layer to inhibit any substantial temperature rise therein regardless of the duration of heating thereof by said gaseous fluid beyond the time required to establish the state of equilibrium.

3. The process of claim 1, wherein the plastisol is of a polyvinyl chloride type, the temperature of said gaseous fluid ranges from substantially 500° F. to substantially 950° F., and the temperature of said base of said drum as determined by said cooling medium ranges from substantially 50° F. to substantially 100° F.

4. The process of claim 1, wherein the thickness of said insulating coating ranges from 2 mills to about 200 mils.

5. The process of claim 1, wherein said low thermal conductivity material is selected from a group consisting of polyfluorohydrocarbons, phenolic resins of the high frequency insulation type, and ceramics.

6. The process of producing thermoplastic film, comprising the steps of spreading a thin plastisol layer of the film forming material on a moving supporting surface of low conductivity material in contact with a metallic base, passing the layer through a heated region, heating the exposed surface of said plastisol layer above the fusion temperature of said layer but below its deterioration temperature by impinging upon the exposed surface of said plastisol layer a stream of hot gaseous fluid at an angle inclined less than approximately 60° from a plane normal to said plastisol layer and at a linear velocity between approximately 4,000 to 10,000 feet per minute and at a temperature substantially above the fusion temperature of said layer, maintaining the surface of said layer in contact with said supporting surface at a temperature just above said fusion temperature of said layer by cooling said metallic base and thereby extracting heat from the low conductivity material and plastisol layer thereon, said steps of heating and cooling being carried on simultaneously, and said step of extracting heat from said plastisol layer by cooling said metallic base being continued in a region of said supporting surface and said base substantailly displaced from the region of impingement of said stream of hot gaseous fluid to solidify said plastisol layer while said layer is on said supporting surface.

(References on following page)

References Cited by the Examiner

UNITED STATES PATENTS

| | | | |
|---|---|---|---|
| 2,488,446 | 11/1949 | Swiss | 18—15 X |
| 2,566,982 | 9/1951 | Clemens et al. | 264—213 |
| 2,632,921 | 3/1953 | Kreidl | 154 |
| 2,648,097 | 8/1953 | Kritchever | 18—47.5 |
| 2,874,484 | 2/1959 | Dapses | 34—187 |
| 2,884,705 | 5/1959 | Flynn | 34—23 |
| 2,894,855 | 7/1959 | Wilhelm et al. | 154 |
| 2,974,364 | 3/1961 | Lambert et al. | 264—213 |
| 2,975,486 | 3/1961 | Kenyon | 18—57 |
| 3,001,232 | 9/1961 | Martinak | 18—155 |
| 3,020,120 | 2/1962 | Loliger | 34—110 |
| 3,050,784 | 8/1962 | Jerothe | 264—216 |
| 3,075,868 | 1/1963 | Long | 156—82 |
| 3,081,496 | 3/1963 | Moore | 264—216 |
| 3,101,722 | 8/1963 | Merritt et al. | 18—155 |

ALEXANDER H. BRODMERKEL, *Primary Examiner.*

MORRISON SUSSMAN, *Examiner.*